US012738431B2

(12) United States Patent
Hanson et al.

(10) Patent No.: US 12,738,431 B2
(45) Date of Patent: Sep. 15, 2026

(54) MULTILAYER SWITCHDOME SYSTEMS AND METHODS

(71) Applicant: Snaptron, Inc., Windsor, CO (US)

(72) Inventors: Jeffrey M. Hanson, Severance, CO (US); Walter Goodrich, Windsor, CO (US); Kevin N. Albertsen, Windsor, CO (US); Peter J. Standiford, Loveland, CO (US); David P. Butler, Windsor, CO (US)

(73) Assignee: Snaptron, Inc., Windsor, CO (US)

( * ) Notice: Subject to any disclaimer, the term of this patent is extended or adjusted under 35 U.S.C. 154(b) by 0 days.

(21) Appl. No.: 17/778,323

(22) PCT Filed: Nov. 21, 2020

(86) PCT No.: PCT/US2020/061692
§ 371 (c)(1),
(2) Date: May 19, 2022

(87) PCT Pub. No.: WO2021/102386
PCT Pub. Date: May 27, 2021

(65) Prior Publication Data

US 2022/0415591 A1 Dec. 29, 2022

Related U.S. Application Data

(60) Provisional application No. 62/939,440, filed on Nov. 22, 2019.

(51) Int. Cl.
*H01H 13/48* (2006.01)
*H01H 13/70* (2006.01)
*H01H 13/78* (2006.01)

(52) U.S. Cl.
CPC ........ *H01H 13/48* (2013.01); *H01H 13/7006* (2013.01); *H01H 13/78* (2013.01);
(Continued)

(58) Field of Classification Search
CPC .... H01H 13/48; H01H 13/7006; H01H 13/78; H01H 2209/002; H01H 2227/01;
(Continued)

(56) References Cited

U.S. PATENT DOCUMENTS 4,689,879 A 9/1987 Fowler
5,828,016 A 10/1998 Grannan et al.
(Continued)

FOREIGN PATENT DOCUMENTS

CA 3162496 4/2023
CN 1787141 A 6/2006
(Continued)

OTHER PUBLICATIONS

International PCT Patent Application No. PCT/US2020/061692 filed Nov. 21, 2020. First Named Inventor: Hanson.
(Continued)

*Primary Examiner* — Lheiren Mae A Caroc
(74) *Attorney, Agent, or Firm* — Santangelo Law Offices, P.C.

(57) ABSTRACT

Multilayer switchdome systems and methods are presented that may enable improved tactile and strength properties and enhanced action. Embodiments may utilize a first layer of spring material (1) and at least a second layer of spring material (2) to form a switchdome component (4). In certain embodiments, the spring material layers may be conjoined by utilizing a switchdome bond (3) to create an integrated bonded composite spring sheet material (7). Various forming processes (8) may be employed in performing the varying embodiments of a method of switchdome component (4) forming. The varying forming processes (8) may improve the physical properties of the tactile switchdome component
(Continued)

(4). The varying processes, spring materials, and switch-dome bond types may be optimized for a particular application.

11 Claims, 9 Drawing Sheets

(52) U.S. Cl.
CPC ... *H01H 2209/002* (2013.01); *H01H 2227/01* (2013.01); *H01H 2227/026* (2013.01); *H01H 2229/058* (2013.01)

(58) Field of Classification Search
CPC ....... H01H 2227/026; H01H 2229/058; H01H 2229/008; H01H 2205/016; H01H 2205/018; H01H 2229/056; H01H 11/041; H01H 13/70; G08B 6/00; Y10T 29/49105
See application file for complete search history.

(56) References Cited

U.S. PATENT DOCUMENTS

| | | | | |
|---|---|---|---|---|
| 5,924,555 | A | 7/1999 | Sadamori et al. | |
| 6,373,008 | B1 | 4/2002 | Saito et al. | |
| 6,548,779 | B2 | 4/2003 | Takahashi et al. | |
| 6,593,537 | B2 | 7/2003 | Teruyama et al. | |
| 6,595,653 | B2 | 7/2003 | Saito et al. | |
| 6,604,278 | B2 | 8/2003 | Sera et al. | |
| 6,730,869 | B2 | 5/2004 | Teruyama et al. | |
| 6,768,074 | B2 | 7/2004 | Twama | |
| 6,917,007 | B2 | 7/2005 | Hirai et al. | |
| 7,205,491 | B2 * | 4/2007 | Kaizu | H01H 13/702 200/520 |
| 8,258,418 | B2 * | 9/2012 | Chen | B29C 65/52 200/302.1 |
| 8,754,342 | B2 * | 6/2014 | Heiskanen | H01H 13/14 200/406 |
| 10,290,442 | B2 * | 5/2019 | Yashima | H01H 13/85 |
| 2002/0030987 | A1 | 3/2002 | Saito et al. | |
| 2004/0129547 | A1 | 7/2004 | Tomitsuka et al. | |
| 2006/0125174 | A1 | 6/2006 | Sera et al. | |
| 2006/0180455 | A1 * | 8/2006 | Sano | H01H 13/7006 200/512 |
| 2006/0225996 | A1 | 10/2006 | Sadamori et al. | |
| 2007/0235310 | A1 | 10/2007 | Li | |
| 2008/0006517 | A1 | 1/2008 | Nishimura | |
| 2009/0242374 | A1 * | 10/2009 | Ohsumi | H01H 13/88 200/5 A |
| 2011/0181402 | A1 | 7/2011 | Goodrich et al. | |
| 2012/0237737 | A1 | 9/2012 | Masutani et al. | |
| 2014/0054155 | A1 * | 2/2014 | Kageyama | H01H 13/48 200/512 |
| 2014/0110237 | A1 * | 4/2014 | Enomoto | H01H 13/85 200/513 |
| 2014/0115925 | A1 | 5/2014 | Hurd et al. | |
| 2016/0071665 | A1 * | 3/2016 | Watanabe | H01H 13/85 200/512 |

FOREIGN PATENT DOCUMENTS

| | | | |
|---|---|---|---|
| EP | 1065688 | A2 | 1/2001 |
| EP | 4062385 | B1 | 5/2024 |
| FR | 2762134 | A1 | 4/1997 |
| JP | 2010097708 | A | 4/2010 |
| WO | 2006071240 | A1 | 7/2006 |
| WO | 2008141192 | A1 | 11/2008 |
| WO | 2008154598 | A1 | 12/2008 |
| WO | 2009091394 | A1 | 7/2009 |
| WO | 2021102386 | A1 | 5/2021 |

OTHER PUBLICATIONS

U.S. Appl. No. 62/939,440, filed Nov. 22, 2019. First Named Inventor: Hanson.
Wikipedia, Elastic Modus. https://en.wikipedia.org/wiki/Elastic_modulus. 4 pages obtained on Oct. 26, 2020.
International PCT Patent Application No. PCT/US2020/061692 filed Nov. 21, 2020. First Named Inventor: Hanson. International Search Report dated Feb. 24, 2021. 2 pages.
International PCT Patent Application No. PCT/US2020/061692 filed Nov. 21, 2020. First Named Inventor: Hanson. Written Opinion of the International Searching Authority dated Feb. 24, 2021. 12 pages.
Patent Abstract of Japanese Patent Application No. 2008265167, Publication No. 2010097708. Cited in the Supplementary Partial European Search Report dated Dec. 14, 2022 in counterpart European patent application No. 20889276.0. 1 page.
Counterpart European patent application No. 20889276, Supplementary Partial European Search Report dated Dec. 14, 2022. 4 pages.
Counterpart European patent application No. 20889276, Communication pursuant to Rule 164(1) EPC, dated Dec. 22, 2022. 2 pages.
Counterpart European patent application No. 20889276, Provisional Opinion Accompanying the Partial Search Result, dated Dec. 14, 2022. 3 pages.
Machine translation of Japanese Publication No. JP2010097708A. Provided in the Supplementary Partial European Search Report dated Dec. 14, 2022. 15 pages.
Machine translation of Chinese Publication No. CN1787141. Provided in the Supplementary Partial European Search Report dated Dec. 14, 2022. 9 pages.
Counterpart European U.S. Appl. No. 20/889,276, Information on Search Strategy, provided in the Provided in the Supplementary Partial European Search Report dated Dec. 14, 2022. 1 page.
Counterpart Canadian Patent Application No. 3162496, Commissioner's Notice—Application Found Allowable dated Nov. 30, 2022. 1 page.
Counterpart Canadian Patent Application No. 3162496, Office Action dated Jul. 12, 2022. 3 pages.
Counterpart European patent application No. 20889276, Communication from EPO dated Mar. 22, 2023, 5 pages.
Counterpart European patent application No. 20889276, Communication pursuant to Article 94(3) EPC dated Apr. 3, 2023. 5 pages.
Certified Canadian Patent No. 3162496, issued Apr. 4, 2023. 1 page.
Counterpart European patent application No. 20889276, Communication under Rule 71(3) EPC Intention to Grant dated Jan. 3, 2024. 9 pages.
Counterpart European patent application No. 20889276, Patent Certificate dated May 29, 2024, 1 page.
Counterpart European patent application No. 20889276, Unitary Patent Certificate dated Jun. 4, 2024, 1 page.

* cited by examiner

SECTION A-A

SECTION A-A

SECTION A-A

MULTILAYER SWITCHDOME SYSTEMS AND METHODS

I. CROSS-REFERENCE TO RELATED APPLICATIONS

This is the United States National Phase of International PCT Patent Application No. PCT/US2020/061692, filed Nov. 21, 2020, which claims the benefit of and priority to U.S. Provisional Application No. 62/939,440 filed Nov. 22, 2019, each said application and any priority case is hereby incorporated by reference in its entirety herein.

This application is an international patent application claiming the benefit of and priority to U.S. Provisional Application No. 62/939,440 filed Nov. 22, 2019, each said application and any priority case is hereby incorporated by reference in its entirety herein.

II. FIELD OF THE INVENTION

This invention relates generally to a focused area in the more general field of tactile apparatus, that focused area here referred to as the "switchdome" field of endeavor. Like the general field of tactile apparatus, this area also includes but is not limited to electrical switches. More specifically, however, the switchdome field of endeavor focuses on apparatus having the peculiar dynamics of often, but not only, domed flexible components that when pushed or compressed by a user can be configured to effect and/or indicate a switch-type action event—be it accomplishing an electrical contact, indicating a level of pressure or force, or otherwise. Through peculiar and perhaps dynamically complex compressive or flexing action, switchdome components in this switchdome field achieve what most users take for granted in many applications, namely, the feel, sound, or other sensations of effectively pushing a button, activating a keyboard key, sensing and/or indicating a level of force, or otherwise achieving a desired switch-type operation. In most popular applications, these types of often user-initiated action events are expected to be accompanied by a tactile or audible snap to indicate that the operation has been successfully completed. While this indication is largely taken for granted by most users, it is often only as a result of devices and components in the switchdome field of endeavor where such components are actually achieving a peculiar and complex dynamic operation, that users are provided this familiar feel, sound, or the like, and these peculiar and complex dynamic operations set this field apart in a number of ways.

III. BACKGROUND OF THE INVENTION

Elastically deformable tactile spring and even switchdome products are conventionally known. In general regards, such switchdome products and components can be understood from inventions of the present applicant such as WO 2008141192 (which deals with the totally distinct concepts of a multi-contact dome and dome height enhancements), and WO 2008141192 and WO 2009091394 (which deal with distinct concepts of sequential electrical contact domes and the like). With respect to the particular enhanced tactile and reliability goals of the present invention, however, seemingly no focus has previously practically solved the existing issues, even though some of the potential implementing technologies have been used in a switchdome context. Interestingly, although some types of bonding and even adhesive bonding in particular have been employed for switchdome componentry, those uses have often been for significantly different purposes and have been included only to achieve significantly different results. For example, over twenty years ago, U.S. Pat. No. 5,828,016 to Grannan disclosed the concept of bonding rolls of material to focus on addressing potential sponginess of a low profile tactile switch and seems to have, if anything, started approaches that teach away from the directions pursued by the present inventors. Similarly, as many years ago, U.S. Pat. No. 5,924,555, and then subsequently US Pat. Appn. Pub. US 2006/0225996, both to Sadamori disclosed the concept of bonding materials together but again focused on the needs of addressing static electricity and other issues of manufacturability, among other aspects. And about ten years later US Pat. Appn. Pub. No. US 2007/0235310 did the same to again focus on static electricity among other aspects. Together, these, if anything, again teach away from the directions pursued by the present inventors. Also, over ten years ago, U.S. Pat. No. 6,595,653 to Saito and US Pat. Appn. Pub. No. 2008/0006517 to Nishimura used some of the implementing technologies instead to focus on issues relative to electroluminescent layers, not issues related to the goals of the present invention, and so ended up seemingly teaching away from the directions pursued by the present inventors. Further, still many years ago, US Pat. Appn. Pub. No. US 2006/0125174 to Sera used adhesive bonding to establish a perhaps insulating cover sheet and once more taught away from the directions pursued by the present inventors. Each of these shows teaching away to differing degrees even though some of the implementing arts had long been available. They were seemingly not recognized as usable in the manners of the present inventors to achieve the peculiar goals of these inventors and this invention.

In spite of this knowledge, interestingly and perhaps surprisingly because of what can at times be considered the complex operational dynamic of the switchdome field, there are often limits to how strong switchdome products can be made in each size and/or with desired tactile properties without reducing fatigue (cycle) life expectancy or otherwise impacting product concerns. As but one example, a spring product made from thin material might have some proper tactile properties and might have a long cycle life but could have undesirably low overall strength or not be adaptable for some applications. Conversely, a spring switchdome product twice as thick might have the desired strength but may lack other desired tactile properties and/or was often shown not to meet fatigue life goals. While there has been a desire to design and achieve switchdome devices achieving all these goals for some time, until the present invention, solutions with the proper combination(s) have not been available. While efforts to achieve desired goals have even been made such as by attempts to use multiple domes loosely placed on top of each other, these efforts have proven practically, commercially, and even technically inadequate and have not solved problems understood in the switchdome industry.

IV. SUMMARY OF THE INVENTION

Accordingly, one of the several goals of the present invention is to provide a practical enhanced-performance switchdome apparatus for user input, or more generally user action, or the like. Another goal is to enhance the strength of a switchdome component's operation without negatively impacting its reliability or life cycle properties. Yet another goal of the present invention is to enhance manufacturing ease and cost while provided desired properties. Still, further goals of the invention are to provide a number of alternatives to the manufacture of both switchdome components and of switchdome action apparatuses as explained below.

In keeping with these and other goals, the present invention provides various solutions to these and other design issues. As an initial overview, it can be understood that in one embodiment, the invention can be understood as providing a pre-bonded formed stack of layers with particular bonds that elastically permit differential movement at differing locales across a switchdome or other component to simultaneously provide enhanced tactile spring and reliability results for manufacturers and users. Composite layers can be stamped to provide an integral unitary product component and yet still retain their differential movement properties to relieve undesirable stresses and enhance fatigue life and the like. In addition, the cost to produce such a multiple component product can be reduced as well as reducing assembly time.

Naturally, these and other goals of the present invention are explained in a number of embodiments and through the following disclosure.

V. BRIEF DESCRIPTION OF THE FIGURES

VI. BRIEF DESCRIPTION OF THE PREFERRED EMBODIMENTS

It should be understood that the present invention includes a variety of aspects, which may be combined in different ways. The following descriptions are provided to list elements and describe some of the embodiments of the present invention. These elements are listed with initial embodiments; however, it should be understood that they may be combined in any manner and in any number to create additional embodiments. The variously described examples and preferred embodiments should not be construed to limit the present invention to only the explicitly described systems, methods, techniques, and/or applications, the specific embodiments shown are initial examples only. Thus, the specification should be understood and is intended as supporting broad claims as well as many embodiments, and even claims where other embodiments may be excluded.

Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 1:
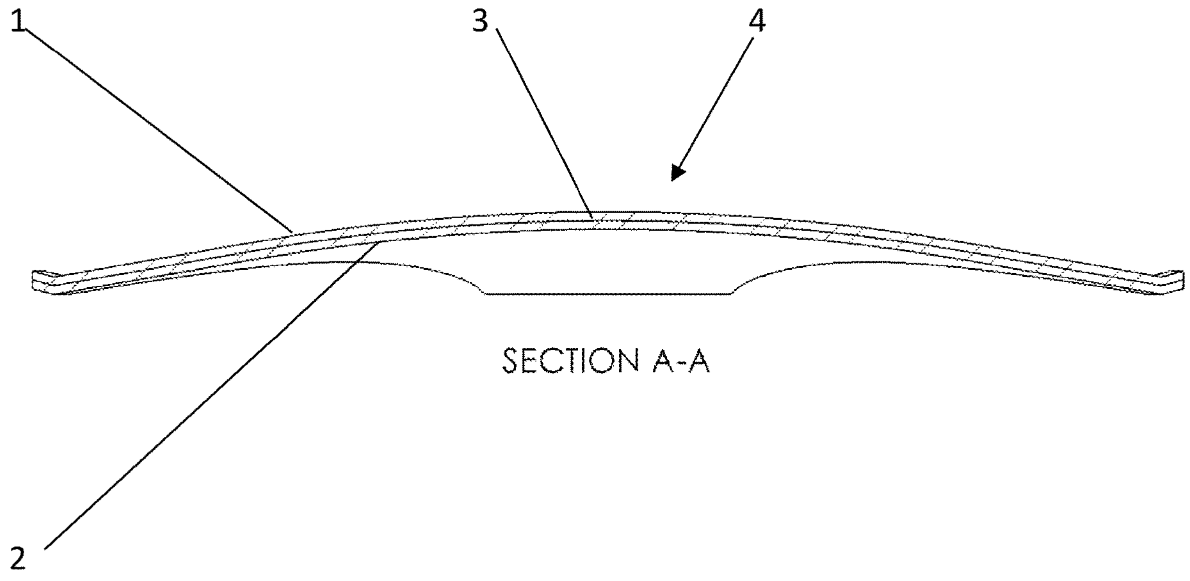
FIG. 1 shows a cross section of an exemplary multi-layer tactile spring product with minimal adhesive thickness.

As shown in FIG. 1, some embodiments may utilize a first layer of spring material (1), a second layer of spring material (2), and may be bonded with a switchdome bond (3) to create a tactile switchdome component (4). In one embodiment, the first layer of spring material (1) may be, but is not limited to, a number of different elements. The layer may be a first sheet of a spring material such as a flexible sheet, a flat sheet, or even a rolled material. The layer may also be a switchdome spring material, as in a material that is proper for forming or already formed into a switchdome component. There may be first, second, third, and even other switchdome spring materials, and similarly first, second, third, and even other layers of switchdome spring materials. As may be understood a layer may be a spring steel material such as is often used for switchdome components. Establishing a spring steel material may be beneficial in some embodiments. When multiple layers are involved, the two (or more) layers may be compositionally homologous spring materials such as when they are both made of the same type of material (even if with differing thicknesses or the like), and conversely, they might be compositionally differentiated spring materials such as where one material may be made of a different substance, have different spring or other properties, or may have a different composition than any one of another of the layer(s). The layer may also be a dome formed or domiformed switchdome spring material such as when a layer is humped, partially hemispherical (even if not from a sphere shape), or in some regards configured as a part of what could be characterized as a dome. In yet additional embodiments a layer may be an arciform material, an arciform-able material, and even an arciformed material such as being previously or already formed into some arc shape. In this regard, it should be understood that an arciformed spring material may be in a dome shape or in a non-dome, in an arc-ed shape, and even including formed such as in a circular or ring shape. In one configuration, a layer can be a bandiform or bandiformed spring or other material such as in a sheet forming a rectangular or so strip; a longer than wide shape (length and width possibly arbitrary depending upon placement, of course), a triangular shape, a square-ish shape, an elliptical shape, and even any other polygon shape to name a few. And it should be understood that arciform spring material may be flat or domed. Some embodiments utilizing a bandiformed spring material may be, but are not limited to, material that is a strip, or that has four sides where two of the sides have larger length than width, or a material that even has four equal length sides. Some bandiformed materials or layers may have significant length as to width and such as an item that essentially forms a strip that could be placed over a dome or in some cases even a ring or circular spring component. Some embodiments utilizing an arciformed spring material or bandiformed spring material may utilize at least partially corresponding arciform spring material where two or more layers are similarly shaped to fit roughly together throughout at least a portion of their regions. In some embodiments, a layer of spring material or switchdome component may be established by providing an arciformed structure, providing an arciformed structure, providing a non-domed arciformed structure, providing a central axis conjoined arciformed switchdome structure, providing a central axis conjoined arciformed switchdome structure, or the like.

In the same or other embodiments, the second layer of spring material (2) may be, but is not limited to, a second sheet of a spring material, at least a second layer of arciform spring material, a second arciform spring material, a second arciformed spring material, a second switchdome spring material, a second switchdome spring material, a second spring steel material, a compositionally homologous spring material, a compositionally differentiated spring material, a second dome formed switchdome spring material, a second sheet of an arciform spring material, a corresponding arciform spring material, a second switchdome spring material, a corresponding arciform-able spring material, or a second bandiformed spring material each as described above. In embodiments a second layer of spring material (2) may be at least a second layer of arciform spring material shaped to form corresponding deformable structures.

Embodiments may be such that it is beneficial for a first layer of spring material (1) to be conductive and in other embodiments non-conductive. Similarly, in some embodiments it may be beneficial for the second layer of spring material (2) to be conductive and in other embodiments non-conductive. This may be accomplished by utilizing a ferrous material as a spring material or otherwise. Non-conductive layers or components may be accomplished by utilizing a non-ferrous material as well. Thus, the tactile spring or switchdome product or component might be made from conductive material like stainless steel if it is being used for electrical switching or it might be made from non-conductive or nonmagnetic material if other properties are desired. In at least one embodiment, both upper and lower layers (that may be laminated to each other) may be conductive; in others, only one, or may be even neither, may be conductive. Further, in certain embodiments, a goal may be to preclude actuation-induced contact between the two layers. Having an elastically deformable portion may complicate or facilitate the previous action but may not preclude it in certain embodiments.

As shown in FIGS. 1, 2, 3, and 7 at least, in some embodiments layers may be bonded or attached to form a switchdome component such as that forms at least a portion of a dome, with the aspect of a dome and that of switching each being broadly understood as described above. In these assemblages, a switchdome component (4) may be, but is not limited to, a number of different elements. Assemblages may be a bonded multilayered springdome components such as where more than one layer is directly or indirectly bonded to another and has a dome shape as well as spring capabilities. They may also be integrated, multiply-springed, multilayered spring switchdome structures such as being suitable for and even configured specifically for use to make a tactile dome. The spring material may be configured as or for a switchdome. And assemblages may present a conjoined spring switchdome action apparatus ranging from a simpler component to an entire functioning user apparatus of nearly any type. Embodiments may involve interstice switchdome bonding such as when bonding occurs in the intervening space between parts, in some cases layers.

As the aspect of different layers becomes understood, it should be noted that the elements or even domes of a layered tactile switch or switchdome product need not be of the same thickness, or even of the same shape, although in particular embodiments, the domes of a multi-dome product may indeed have the same thickness and/or same shape as each other. Further, the concept of a dome, as used herein, is broad, and is not limited to those products or product portions that are shaped like a spherical section, as indeed, other shapes, including those whose surfaces are not smoothly or uniformly curved, may also be considered domes.

As mentioned above, the switchdome field can include electrically active switch devices. Thus, in some embodiments, a switchdome component (4) can involve an electrically conductive switchdome element, or electrically conductive switchdome components. In some embodiments, electrically conductive interstice switchdome bonding such as when bonding in the intervening space between parts, in some cases layers, may be useful in creating an electrically conductive switchdome component. In electrical applications, a switchdome product may have an elastically deformable portion that may even have a movable contact surface or a stationary contact surface.

In embodiments, the surface may contact at least some of a movable contact surface and may create an electrical connection. Thus, there may be a stationary contact surface on which the switchdome component (4) may be mounted. In some embodiments, an electrically conductive path may be provided for or via the switchdome assemblage, such as, but not limited to, an electrically conductive surface path, a printed circuit board path, or by providing a conductive switchdome component. Electrical conductivity may be accomplished by utilizing a ferrous, metallic material, or in some cases a graphite-based or other structure. Conversely, it may be beneficial to utilize a substantially insulative switchdome element if electrical conductivity is unwanted in an embodiment or part of an embodiment. In one embodiment it may be beneficial to utilize substantially electrically non-conductive interstice switchdome bonding. When insulative properties are required for an embodiment, a non-ferrous material that is a good or sufficient insulator such in being substantially electrically non-conductive, may be utilized.

It may be beneficial to utilize a stationary contact surface unconstrained switchdome layer or even a stationary contact surface attached switchdome layer to achieve the desired switchdome properties in embodiments especially when electrical "switching" is desired. Further, this may be achieved through establishing a stationary contact surface attached switchdome layer or establishing a stationary contact surface unconstrained switchdome layer. It may be that in some embodiments the surface contacts at least some of said movable contact surface. In some embodiments establishing a stationary contact surface attached switchdome layer or establishing a stationary contact surface unconstrained switchdome layer may be beneficial.

In embodiments, elements such as the first layer of spring material (1) and the second layer of spring material (2) may be joined together with a switchdome bond (3). This switchdome bond may be a bond that is configured for or chosen to be appropriate for application to the switchdome field and even as appropriate for the goals of the present invention. In embodiments, the switchdome bond may first create an integrated bonded composite spring sheet material (7) wherein at least one location between two or more layers of spring material are switchdome bonded (3). The switchdome bond may be used to compositely form an integrated compound spring switchdome action apparatus such as an apparatus that includes a compound or more than one spring to achieve an integrated spring capability for a user or device or apparatus action.

Compositely forming may provide increased mechanical or physical properties for a switchdome component (4). Various actions may be performed through use of such apparatuses that include but are not limited to such integrated compound spring switchdome action apparatus. These apparatuses may be such as a switch component apparatus as in a component from the switchdome field that would be for use in creating a separate switch component for use in any type of device.

They may also be a phone switch component apparatus, such as a switch component for use in creating a switch for a phone, a phone switch apparatus such as a separate switch element for use in a phone, and even an entire phone apparatus that has as some included element an item from the switchdome field. Similarly, they may also be a keyboard key component apparatus, a keyboard key apparatus, a keyboard apparatus, and even an entire keyboard. The apparatuses may also include a mechanical spring component apparatus and even an entire mechanical spring apparatus. In some embodiments, a mechanical spring apparatus or a mechanical spring component apparatus may be used to provide feedback, feel, sound, or the like to a user or to a component of any type of system.

Figure 2:
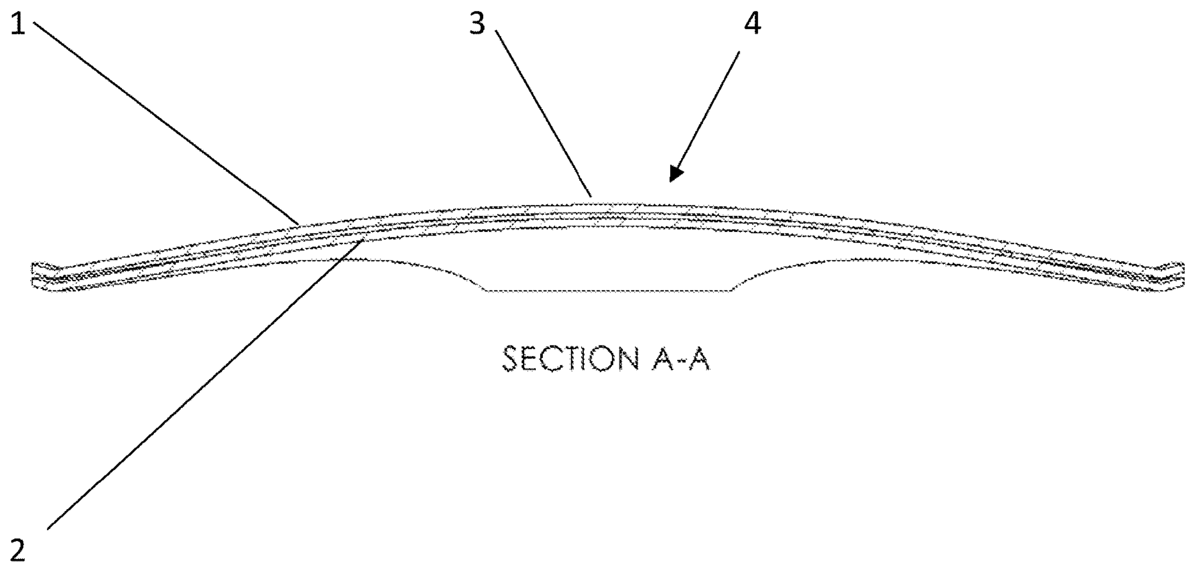
FIG. 2 shows a cross section of an exemplary multi-layer tactile spring product with adhesive thickness.
Figure 3:
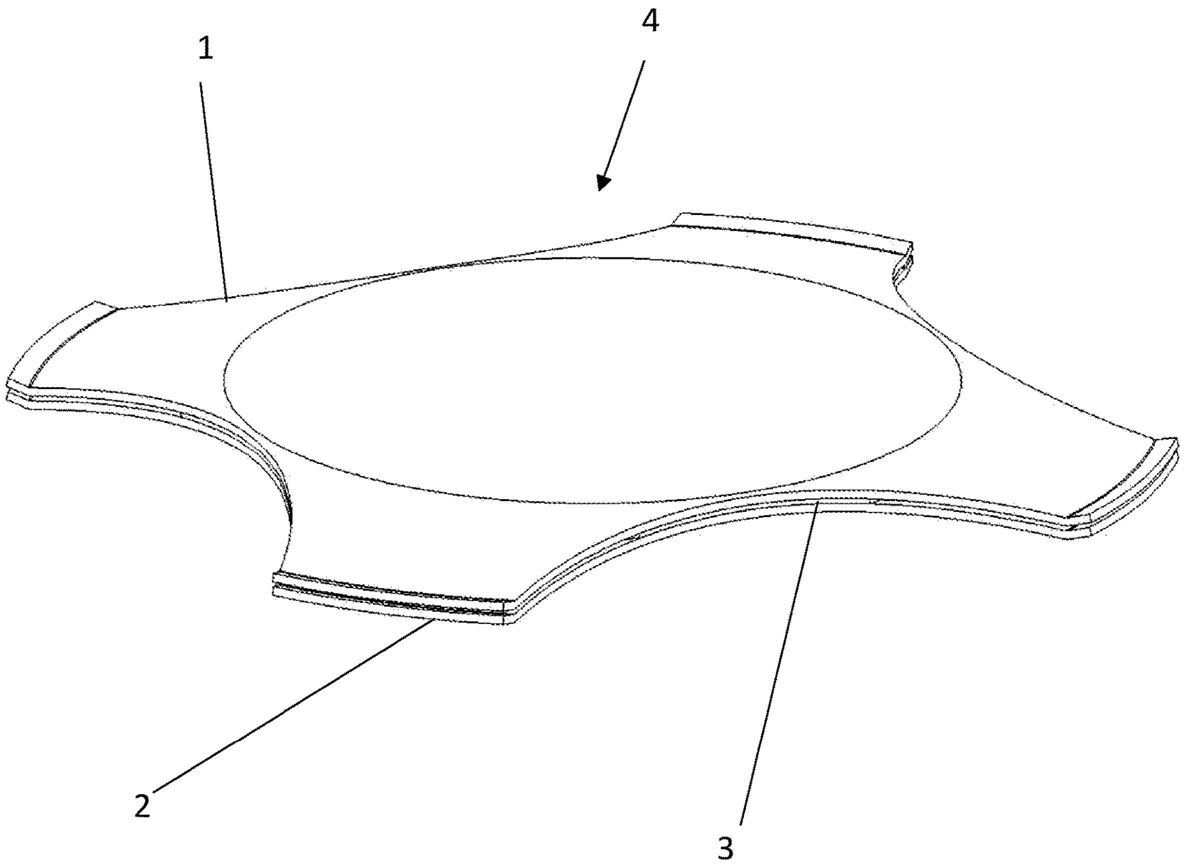
FIG. 3 shows an exemplary multi-layer tactile spring product with adhesive thickness.

FIG. 2 shows a cross-section of an exemplary two-layer tactile spring product with some adhesive thickness. In this embodiment, the switchdome bond (3) may be elastically joined such that it provides a desired amount of elasticity in the bond for purposes described herein. Embodiments may present the bonded area as an area that is partially bonded, or bonded only throughout a portion of the area between the two (or more) layers. A switchdome bond may be configured to join layers as well as to allow at least some relative movement among layers. Similarly, the area can be totally bonded such as when nearly the entire area between layers is bonded. In like fashion, embodiments can involve a bond that only partially bonds locales or partially prevents movement between layers (to all of just some degree) so that other portions or locales of the layers or the like are free to have relative movement between them or the like such as by a partially prevented switchdome bond. It may be beneficial for a switchdome bond to be configured to only partially prevent relative movement between a first layer of spring material (1) and at least a second layer of spring material (2) to optimize mechanical, electrical, or physical properties, and/or to allow differentially movement or moving of said switchdome component (4).

By utilizing a number of bonding methods, embodiments can achieve desired goals. For example, by elastic bonding (or similarly by including an elastic bond) embodiments can present or involve a bond that is elastic in one or more directions. Similarly, embodiments can present or involve a fully allowable flexure bond (or similarly by including a fully allowable flexure bond or even fully allowable switchdome bond) embodiments can present or involve that most of the full area between layers or in some embodiments portions of layers can be configured so that all or most of that area is capable of some flexure in the bond such as to facilitate relative movement or the like.

Fully allowable flexure bonding may provide an efficient solution to create a fully allowable switchdome bond. In some embodiments, fully allowing flexure throughout a switchdome bond may be beneficial to providing the required switchdome component (4) properties. By utilizing elastic switchdome bonding, in some embodiments, an integrated, elastically joined, multiply-springed, multilayered spring switchdome component may be created.

Further, by switchdome bonding a first locale and not switchdome bonding a second adjacent local (an adjacent non-bonded switchdome locale (10)) embodiments can present or involve differing portions or locales that are and are not bonded. Elastically switchdome bonding in the vicinity of at least some locale established at least at one location, or at at least some locale established at least at one location between layers of spring materials, may be beneficial to facilitate relative movement or the like. At a bonded switchdome locale, elastic switchdome bonding may be present. Elastically switchdome bonding may be achieved by substantially electrically non-conductive interstice switchdome bonding; locationally differentiated switchdome bonding; substantially only central axis switchdome bonding; non-elastic substantially only central axis switchdome bonding with other areas differently or not bonded, spot welding, or, but not limited to, elastic substantially only central axis switchdome bonding. As mentioned above, by total switchdome elastically bonding (or similarly by including a total switchdome elastic bond) embodiments can present or involve a bond that is substantially present in all or most of the space between any positions of the layers to be bonded. By partial switchdome elastically bonding (or similarly by including a partial switchdome elastic bond) embodiments can present or involve a part of the bond being elastic and the other part being either non-elastic or perhaps even not bonded. Embodiments can include elastic shear switchdome bonding (or similarly by including an elastic shear switchdome bond or alternatively an elastic shear bond) embodiments can present or involve an elastic bond that is elastic in a shear direction (perhaps only or among other directions) such as to permit shear movement between layers. In this regard, embodiments can include establishing at least some nonorthographic elasticity bond (or similarly by accomplishing at least some nonorthographic elasticity bonding) which can allow elastic movement in a direction that is not only perpendicular or parallel to the layer surfaces such as to permit layers to move relative to each other in a more complex net direction. In these, the elastic bond can facilitate on average elastically moving in a nonorthographic direction that is on average neither perpendicular to the localized layer surface plane nor parallel to the localized layer surface plane in that area. Embodiments can include the step of interstice switchdome bonding (or similarly by including an interstice switchdome bond) which can present or involve a bond in the intervening space as mentioned above. When considering manufacturing techniques and processes, embodiments can be arranged to achieve pre-cured, pre-established switchdome bonding (or similarly by including a pre-cured, preestablished switchdome bond), embodiments of processes or the elements can allow for a step of creating a bond before forming the actual switchdome component. This may be accomplished by pre-establishing said switchdome bond and later forming a dome shape. Similarly, processes can involve pre-curing a switchdome bond (or similarly by including a pre-cured switchdome bond) where the bond can be cured and then the switchdome component or other element formed, and can also involve pre-establishing a switchdome bond (or similarly by including a pre-established switchdome bond) whether by prior supplier purchase, prior manufacturing steps, or the like. Thus, in some embodiments, a switchdome bond and then later forming the switchdome component may be achieved.

Combinations of different bonding techniques are also possible. In embodiments, a switchdome bond (3) may be a combination switchdome bond or may present the step of combination switchdome bonding such as where there is more than one type of bond present in a singular switchdome component. As but one example, there may be an elastic bond as well as a fixed bond perhaps in one example as in a spot weld or another type of weld, such as a friction-stir weld, configured to establish a switchdome bond (3). These may be present in one switchdome component and that may thus be a component that includes a combination bond. A combination switchdome bond may be, but is not limited to a variety of different bonds and even a combination of bond and no bond areas. Such switchdome bonds may include a spot weld with an adjacent adhesive bond; a magnetic bond and adjacent adhesive bond; or a first adhesive type bond and an adjacent second adhesive type bond. Naturally as can be appreciated, any different combinations are possible and all permutations and combinations should be understood as included in this disclosure. A combination switchdome bond may be formed by spot welding and adjacent adhesive bonding, spot welding and adjacent non-bonding, magnetic bonding and adjacent adhesive bonding, or first adhesive bonding and second adhesive bonding. Again, as but one example, FIG. 7C shows there may be a switchdome bond (3) that utilizes a first bond type (6) such as spot welding and a second bond type (5) such as adjacent adhesive bonding. As can be appreciated, magnetic bonding and adjacent adhesive bonding, first adhesive bonding and second adhesive bonding, or the like to create the desired type of combination switchdome bond may be appropriate to achieve desired properties. In some embodiments, adhesive switchdome bonding may be beneficial in creating combination switchdome type bonds. In one embodiment as shown in FIG. 7C, there may be a first bond type (6) such as a first adhesive and a second bond type (5) such as a second adhesive that are utilized in varying locations between the first layer of spring material (1) and the second layer of spring material (2). In some embodiments, the layers of spring material may be magnetically joined allowing elastic movement between the joined layers. The layers may either be magnetized by coming into contact with a ferrous material or through the use of an electromagnet.

Figure 7A:
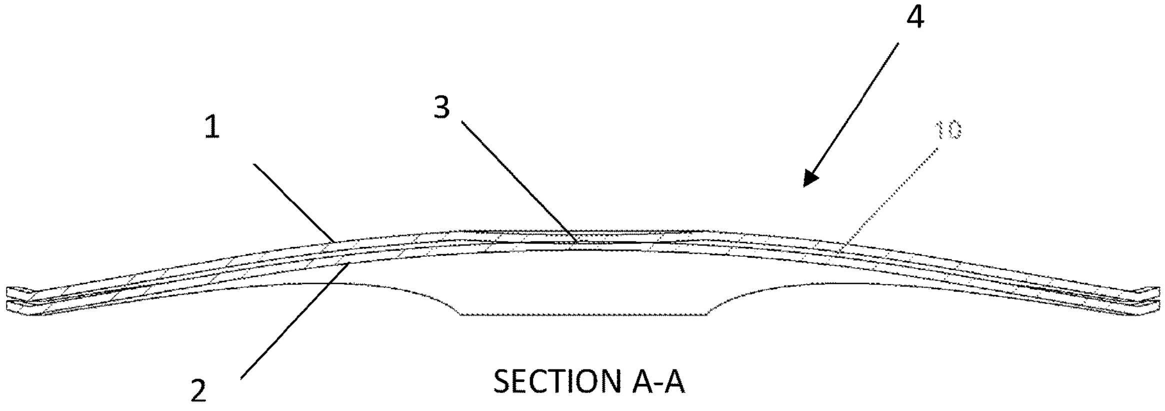
FIG. 7A shows an exemplary multi-layer tactile spring product with an example of a switchdome bond.
Figure 7B:
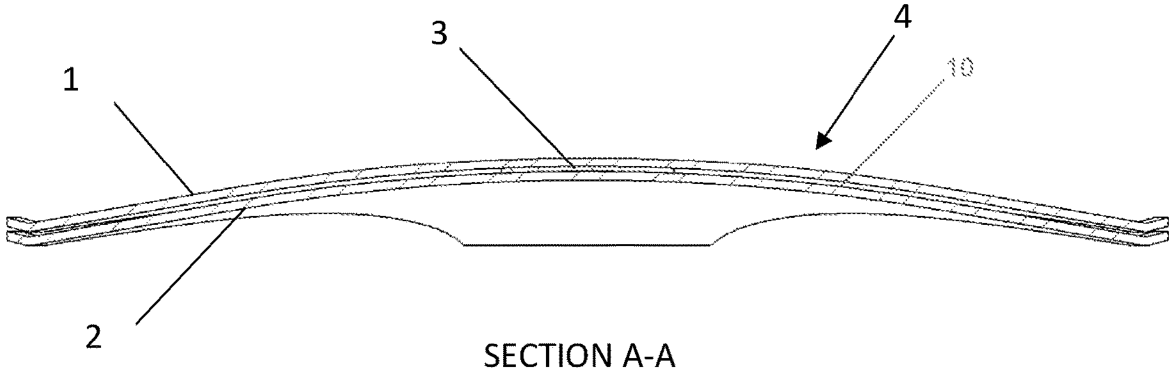
FIG. 7B shows an exemplary multi-layer tactile spring product with another example of a switchdome bond.
Figure 7C:
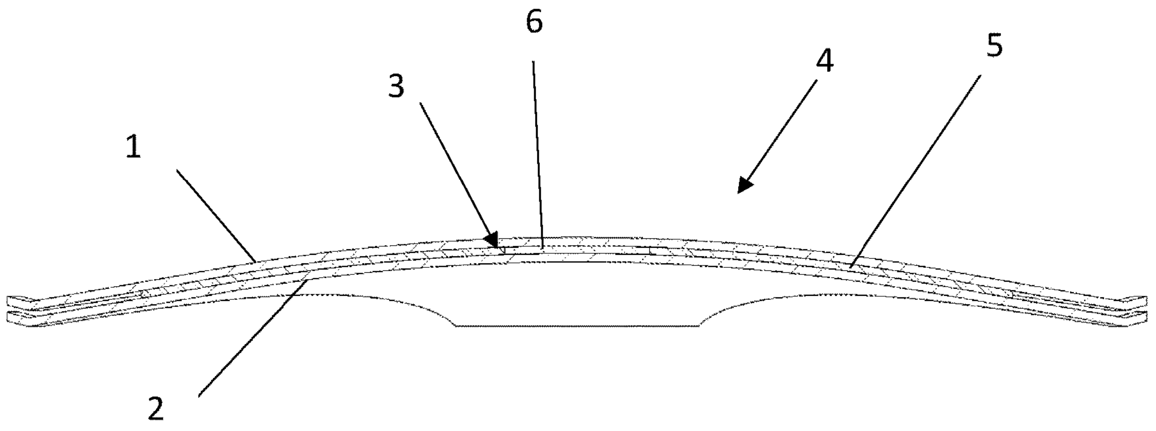
FIG. 7C shows an exemplary multi-layer tactile spring product with another example of a combination switchdome bond.

As mentioned above, in some embodiments, for example illustrated in FIG. 7A and FIG. 7B, a switchdome bond (3) may be a partial switchdome bond. This partial switchdome bond may be an elastic bond that allows operational differential internal relative movement of a first layer of spring material (1) and a second layer of spring material (2) at at least some locale. A partial switchdome bond may be, but is not limited to, a partial switchdome elastic bond, an elastic shear bond, and other bonds. There can also be a central axis-perimeter antipodal rigidity bonding such as where the type of bond at the central axis (such as a center of a dome if spherical or a similar area if not spherical) as compared to a perimeter (such as the edge or where a dome or the like terminates) have differing rigidities and hence at the antipodes (center versus edges) the component can have antipodal rigidity or rigidities. In some embodiments, central axis-perimeter antipodal rigidity switchdome bonding may be beneficial to optimize the desired switchdome properties. More generally, embodiments can have a simultaneous high and low rigidity composite bond with high and low being determined relative to each other (e.g., percentage and multiple modulus of elasticity examples as set our below can be applied for this). In these embodiments, it should be noted that a high rigidity bond can be a welded bond such as a spot weld, and a low rigidity bond can be a no rigidity bond at all as in an unbonded area or zero rigidity bond. In allowing relative movement as discussed herein, embodiments can present an operational differential switchdome shear movement bond whereby in operation such as pressing the switch or compressing switchdome component, there may be differential switchdome shear movement such as in one example, where at the center of the dome there may have little or no shear movement whereas at the edge there is apparent shear movement between the layers during the operational motion. Differentially switchdome shear moving a switchdome during operation of the switchdome may be beneficial in certain embodiments. Allowing a switchdome bond to be partially prevented or elastically joined may facilitate this unique differential flexure and may allow embodiments to present or involve a differential flexure switchdome. Similarly, in certain embodiments that may even be dependent on the switchdome bond type and spring material, and a switchdome component (4) may present a differential flexure switchdome to allow operational differential internal relative movement. Embodiments may provide a tangential slippage portion switchdome such as where there is tangential slippage or relative motion especially when unbonded or perhaps even when touching each other at that location of the two layers at some portions (in the above example differential movement perhaps being most pronounced at the edge).

As mentioned, embodiments may provide integrated switchdome elements. In some embodiments there can be a central axis conjoined switchdome such as one that is joined at mostly only the central axis as explained above. There can also be simply a conjoined spring switchdome where two layers or parts are joined. Embodiments can provide a central axis conjoined arciformed switchdome structure where one layer is an arciformed layer (perhaps such as the bandiformed layer discussed above) and that arciformed layer is joined with another layer at mostly only what would therein be identified as that total component's likely central axis. In understanding such central axis conjoined items, it can be appreciated that embodiments may provide a partial elastic switchdome bond or even no bond around a single spot weld perhaps at or near a likely central axis. This may allow differentially switchdome shear moving of a switchdome during operation of the switchdome. As further explained above, a switchdome bond may include at least some nonorthographic elasticity bond and that may be one way to allow for differential movement of the first and second layers of spring material.

In some embodiments, by partially preventing, allowing, or hindering movement of a first layer of spring material (1) relative to a second layer of spring material (2) through appropriate bonding, differential moving of a bonded item may be achieved during operational action. Such relative displacement may be most readily observed in or understood from some or all non-central areas of the stacked dome type embodiment as but one example. For example, in order to better identify the direction of such displacement, it may be helpful to construct a 3D xyz system that is unique to and centered on a point of interest within the bond, where the xz plane of that axis is disposed between, and parallel with, two x-z planes, one of which is tangential to the underside of for some embodiments, a "dome" immediately above the point of interest, and the other of which is tangential to the upper side of the "dome" immediately above that point of interest. As such, the relative displacement of any isolated section of such a stacked product may include a relative displacement component in the xz plane and/or a relative displacement in the y plane. As can be appreciated, the orientation of the xyz coordinate system can be unique to a point on the, for example, dome, and may change (even perhaps only slightly) depending on the location of that point. Further, depending on the choice of bond (e.g., adhesive, etc.) used at a particular point between the upper and lower domes or more generally layers, that relative motion may be fully allowed (most flexible adhesive or in all areas), fully prevented (least flexible/most rigid adhesive or the like) or mitigated to varying degrees (adhesive of intermediate flexibility) between such extremes.

As discussed above to some initial degree, operational action may be any action that provides feedback to a user or a component of a system and/or any action that creates electrical contact either completing a circuit or providing an input to a system. In some embodiments, during operational action the deformable dome or other item may contact another material on engagement of the dome or other item. This engagement may be considered as creating or causing an input or may be an action. Such an input, or more generally action, may be to achieve an electrical signal or through energy supplied to a device such as in a feedback apparatus instead of an input. Purely spring applications such as bolt torque applications and the like may be possible in some embodiments and may not even have a tactile feel nor be user interface related.

As mentioned above, in some embodiments a switchdome bond (3) may be, but is not limited to, a fully allowable flexure switchdome bond as explained above. In other embodiments, the bond may present as an electrically conductive interstice switchdome bond in the intervening space between layers. In other embodiments, the bond may be a substantially electrically non-conductive interstice switchdome bond at the same location. Embodiments can even have a locationally differentiated switchdome bond such as where the bond exists to either a differing degree or to no degree at all versus to some degree at different locations on or across a switchdome element. Embodiments can present a substantially only central axis bond, a non-elastic substantially only central axis bond, an elastic substantially only central axis bond, and even a single or multiple spot welds. In addition, an adhesive bond is possible and an adhesive bond can be provided in even a partially-joined switchdome bonding embodiment.

Figure 4:
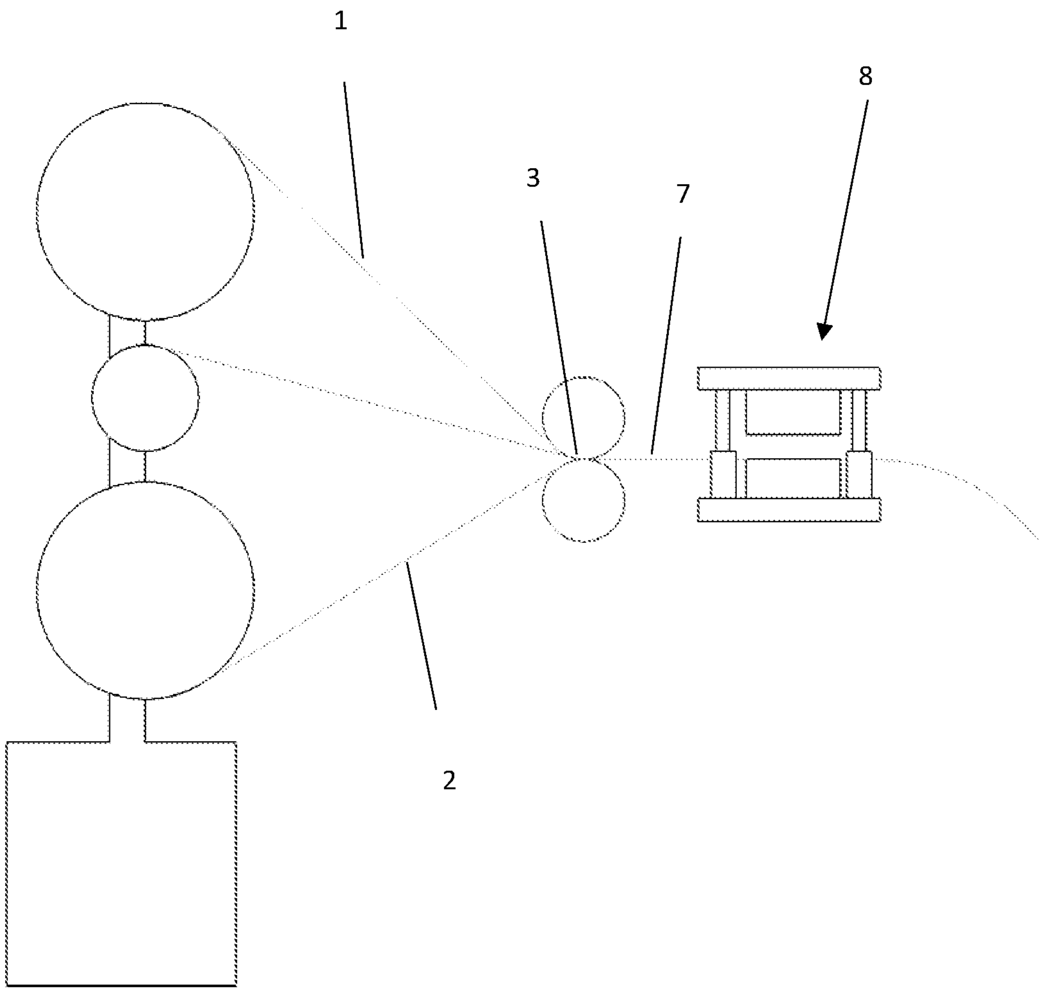
FIG. 4 shows an exemplary material path through unwind, bonding and product creation using a wound adhesive.
Figure 5:
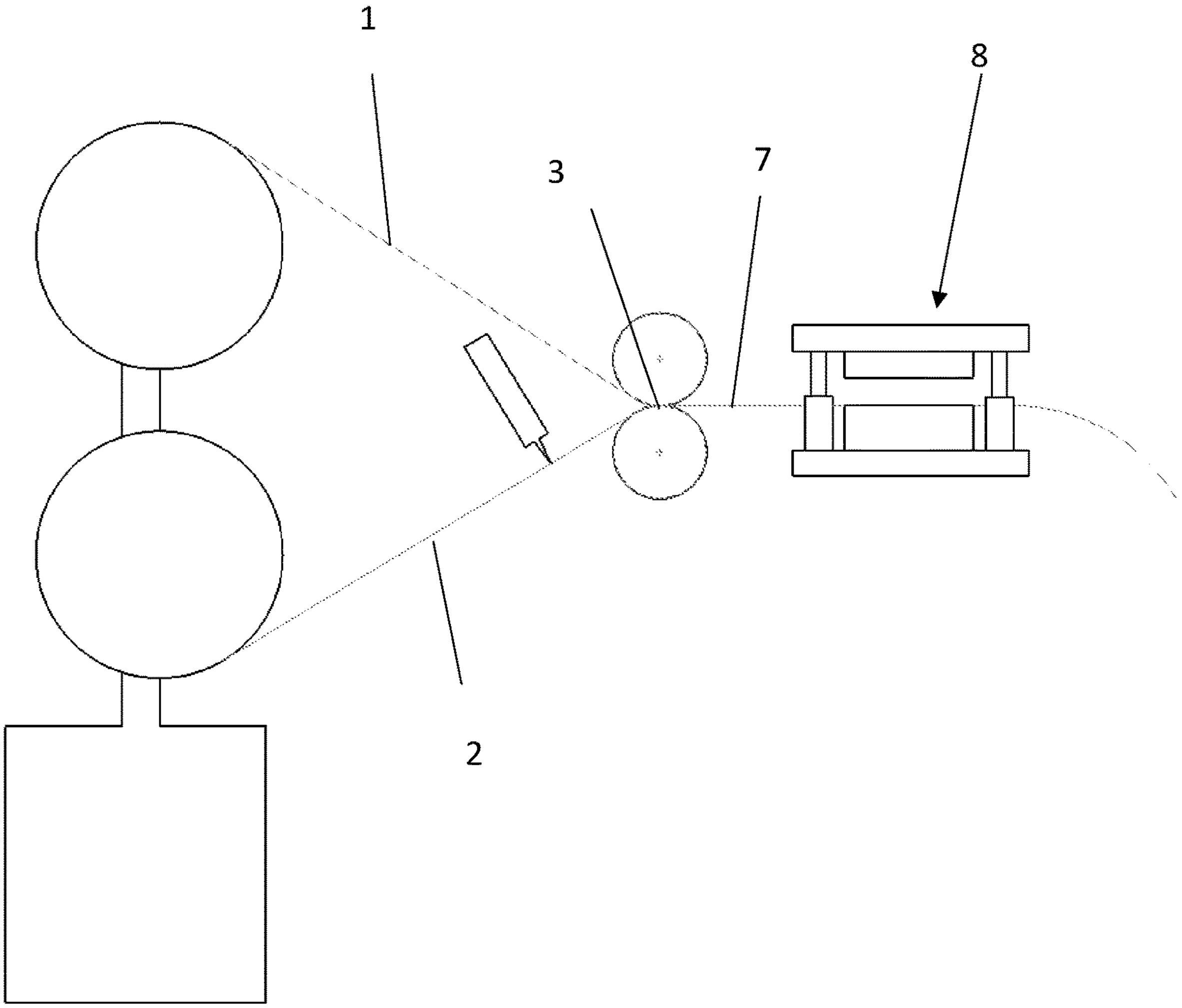
FIG. 5 shows an exemplary material path through unwind, bonding and product creation using a liquid adhesive.
Figure 6:
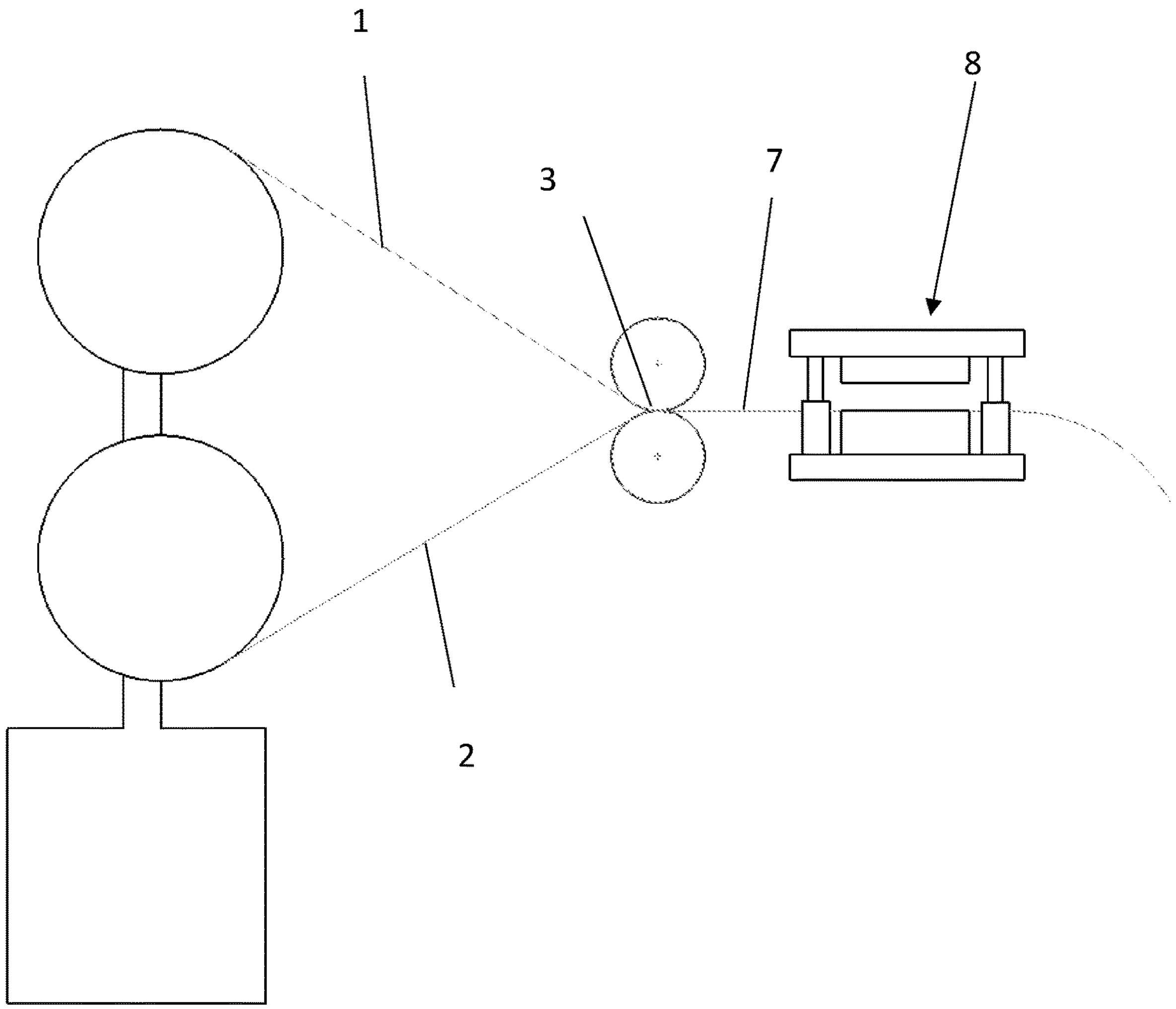
FIG. 6 shows an exemplary material path through unwind, bonding, and product creation using welding rollers.

FIG. 4, FIG. 5, and FIG. 6 illustrate exemplary embodiments of methods of manufacture. In some of these embodiments, a first layer of spring material (1) and a second layer of spring material (2) may be a rolled stratum, such as but not limited to a roll of spring material. In other embodiments, a first layer of spring material (1) and a second layer of spring material (2) may be a flat stratum, such as a flat sheet of spring material. In yet other embodiments, it may be beneficial to combine a rolled stratum and flat stratum to optimize the efficiency of the process. A flat or rolled stratum can even be used for locating appropriate bond positions. Utilizing a rolled stratum may be beneficial in some embodiments. In the illustrated embodiments, the first layer of spring material (1) and the second layer of spring material (2) may be joined together by some type of switchdome bonding to create an integrated switchdome composite (7). Then perhaps through a forming process (8), a switchdome element may be formed from said integrated switchdome composite (7). An integrated switchdome composite (7) may be formed to establish an integrated, multiply-springed, multilayered spring switchdome.

Depending on the embodiment, the forming process (8) may be, but is not limited to, stamping, thermoforming, hydroforming, vacuum forming, domiforming (such as making some portion of a roughly dome shape including as explained above), roll forming, or forging. In some embodiments, domiforming may be the process of forming a switchdome or dome like structure from any variety of forming methods. Utilizing a first sheet of spring material and utilizing a second sheet of spring material, domiforming the sheets of spring material may be beneficial to optimize a particular forming embodiment. In another embodiment, unwinding a first sheet of spring material then or simultaneously unwinding a second sheet of spring material thereby arranging for switchdome bonding to create an integrated switchdome composite. During a forming process (8), spring material may be shaped to form some corresponding deformable spring regions utilizing a switchdome bond configured to join layers. In some embodiments forming the switchdome after accomplishing the step of switchdome bonding may be beneficial and in others forming the switchdome before accomplishing the step of switchdome bonding may be beneficial. A desired multilayered tactile spring or perhaps switchdome product can be made in one process by bonding more than one strip of material together first before stamping. This can create a lower cost product than stacking unbonded tactile spring products, but with similar spring and fatigue life properties. The sheets or perhaps strips might be stainless steel, some other metal, something nonmagnetic, or something just nonmetallic as well. In bonding, the bonding material may include but not be limited to an adhesive. It may also be selectively applied so that, after stamping, the desired bond (e.g., adhesive of the desired flexibility) is disposed at the intended areas between the two stamped products. The strips or sheets could be bonded by tack welding at points along the strip that would line up with the center of the product. Embodiments can include seam welding electrically or ultrasonically. In one exemplary lamination process, a layer of a single type of conductive or, alternatively nonconductive adhesive, might be applied between the layers. This might be flexible if it covers more than just the center of the product. This can allow some small degree of flexing of the layers relative to each other. Adhesive, which, in certain embodiments, can cause the switchdome bond, might be dispensed as a liquid (of varying viscosities), and have a glue- or epoxy-like consistency, or be applied as a tape. It might be pressure sensitive or might be cured by heat or light.

In some embodiments, the spring material may be unwound from a roll or might be straight pieces. The bond, whether adhesive or otherwise, could be applied between layers of spring material. The materials could then be aligned and/or pressed together. This action might activate the adhesive or perhaps it could be cured by heat or light. Alternately, and as mentioned above, the layers of material could be held together by some sort of welding or forming process. The weld could be a seam weld (a line) or spot welds (points) and could be created by ultrasonic, laser, electrical resistance welding, friction-stir welding, or otherwise. It might be desirable to line up the bond (e.g., spot weld) points with or roughly to the center of each product to be stamped to allow them to flex properly and avoid creating any heat affected areas in the higher stress zones of the product. A goal of the inventive process disclosed herein may be to manufacture a joined double layer tactile spring switchdome product.

In the after-bonding forming processes, the bonded material can later be punched and formed to create the tactile spring switchdome product. Further, punching through adhesive may require some special processes, but otherwise can be done in the same way as normal production. It may be necessary to chill the adhesive before punching to reduce transfer to the tooling, particularly if it is unacceptable to simply wait until it is cured before additional fabrication steps. Special lubrication or cleaning operations may also be necessary. In certain embodiments, the product can be created by punching or even cutting parts of the material to create the general outer shape. In some embodiments, the desired shape may then be formed into the spring product, during or after which the spring product may be removed from the material. In certain embodiments, punching and forming can occur after bonding but can also occur in either order (e.g., punching before forming or forming before punching). At times, it may also be desirable to leave the spring product in the strip or sheet material to be used in that form or even removed in a later process. Such removal could be part of the assembly automation for example.

Further, in certain applications, it may not be necessary for the adhesive to last as long as the tactile spring product. The two layers may only need to stay together through the manufacturing process and perhaps also through the assembly process. This may be because in most (or at least many) applications, the two layers would be retained in some way (such as in a switch housing) so that a failure of the adhesive material would not be detrimental (e.g., because the housing or the like could keep the two layers in functional relative position).

Referring again to the illustrated examples in FIG. 4, FIG. 5, and FIG. 6*a* first layer of spring material (1) utilizing a first sheet of spring material, and a second layer of spring material (2) utilizing a second sheet of spring material, may be involved by unwinding the first sheet of spring material and simultaneously, or at any other time interval, unwinding the second sheet of spring material and then bonding to create an integrated switchdome composite (7). In some embodiments domiforming or arciforming said sheets of spring material may occur, or forming a switchdome element from said integrated switchdome composite (7) may be performed.

As mentioned above, assemblages can be presented by embodiments of this invention. An integrated switchdome composite may be, but is not limited to, a conjoined integrated dome composite such that domes or other elements are joined to present one integrated component for use in assembly or manufacture. Similarly, embodiments can present a conjoined sheet of spring material where two sheets, planar or not, may be joined even prior to final forming or the like. Before or after forming, embodiments can provide a conjoined switchdome composite where the composite has more than one layer and is joined together as one element. Other embodiments can utilize a first dome and a second dome as the first layer of spring material (1) and the second layer of spring material (2). Further, a first dome and second dome may be switchdome bonded together by switchdome bonding the first dome to the second dome perhaps creating a conjoined integrated dome composite. In some embodiments manufacture from unformed sheet switchdome spring material may be beneficial and may be accomplished by forming said unformed sheet switchdome spring material. In some embodiments, a switchdome component may be a conjoined first dome and second dome composite switchdome element. Utilizing a first dome, utilizing a second dome, and switchdome bonding a first dome to a second dome to create a conjoined integrated dome composite may be beneficial.

As mentioned above, in some embodiments it may be beneficial for the switchdome bond (3) to have elasticity. Here, it may be beneficial to choose switchdome bond material based on the material property of modulus of elasticity, also known as a material's Young's Modulus. Accordingly, in some embodiments the switchdome bond's modulus of elastically may be, but is not limited to, a low modulus of elasticity bond, a low relative to adjacent material modulus of elasticity bond, and even a less than or equal to 0.8 GPa (modulus of elasticity) switchdome bond. In terms relative to an adjacent material, a bond may have an elastic modulus of about four-tenths of a percent of the elastic modulus of an adjacent spring material. In others, a range of similar but ratio-ed percentages can range from two-tenths percent to six-tenths percent of the elastic modulus of an adjacent spring material. More broadly, a bond material-spring material modulus of elasticity ratio (the ratio of the modulus of the bond material to the spring material) can be less than or equal to twenty-five percent, less than or equal to ten percent, less than or equal to five percent, less than or equal to two percent, less than or equal one percent, less than or equal one-half percent, less than or equal to one-quarter percent, and less than or equal to one-eighth percent. An elastic switchdome bond may be formed by bonding to establish a low modulus of elasticity bond, bonding to establish a low relative to adjacent material modulus of elasticity bond, bonding to establish a modulus of elasticity less than or equal to 0.8 GPa switchdome bond, bonding to establish a modulus of elasticity less than or equal to 50 GPa switchdome bond, a less than or equal to 25 GPa switchdome bond, a less than or equal to 10 GPa switchdome bond, a less than or equal to 5 GPa switchdome bond, a less than or equal to 2 GPa switchdome bond, and a less than or equal to 1 GPa switchdome bond, bonding with a cure material having an elastic modulus of about four-tenths of a percent of the elastic modulus of an adjacent spring material, etc.

Conversely, in some embodiments, the first layer of spring material (1) and second layer of spring material (2) modulus of elasticity may have values that are beneficial to creating the desired switchdome component (4). In these, utilizing a spring material with a modulus of elasticity greater than or equal to one-hundred ninety gigapascals, greater than or equal to one-hundred gigapascals, greater than or equal to one-hundred-fifty gigapascals, greater than or equal to two-hundred gigapascals, and greater than or equal to two-hundred-fifty gigapascals, greater than or equal to one hundred times, greater than or equal to one hundred fifty times, greater than or equal to two hundred times, greater than or equal to two-hundred fifteen times, and greater than or equal to two-hundred-fifty times the adjacent bond structure modulus of elasticity, about two-hundred thirty-seven times the modulus of elasticity of an adjacent bond material, or within a range of one hundred fifty to three hundred times the modulus of elasticity of the adjacent bond material may be beneficial. Further, this may be achieved through establishing a spring material comprises establishing a spring material about two-hundred thirty-seven times the modulus of elasticity of an adjacent bond material or from one-hundred fifty to three hundred times the modulus of elasticity of an adjacent bond material.

Figure 8:
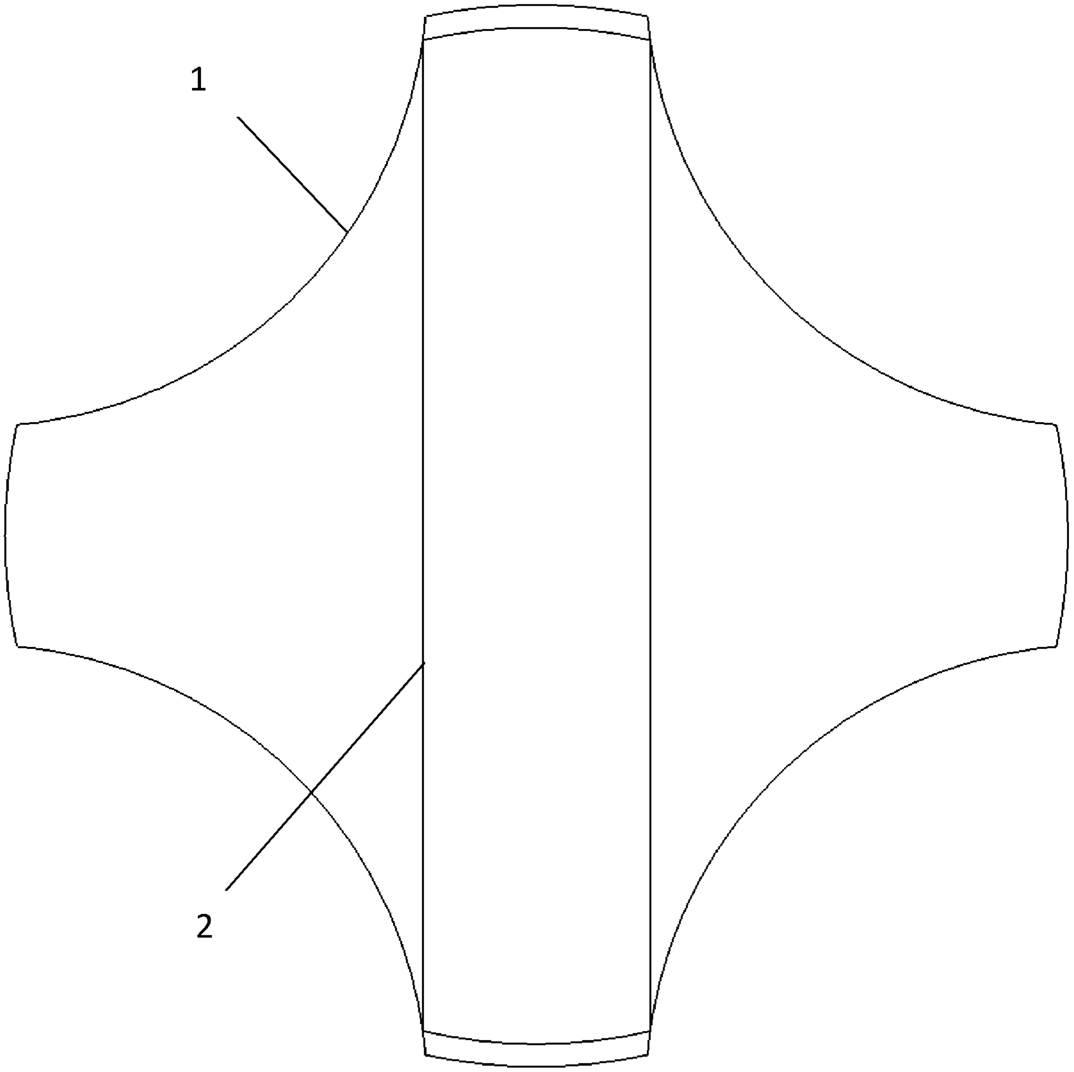
FIG. 8 illustrates an exemplary embodiment of an arciformed or bandiformed layer of spring material
Figure 9:
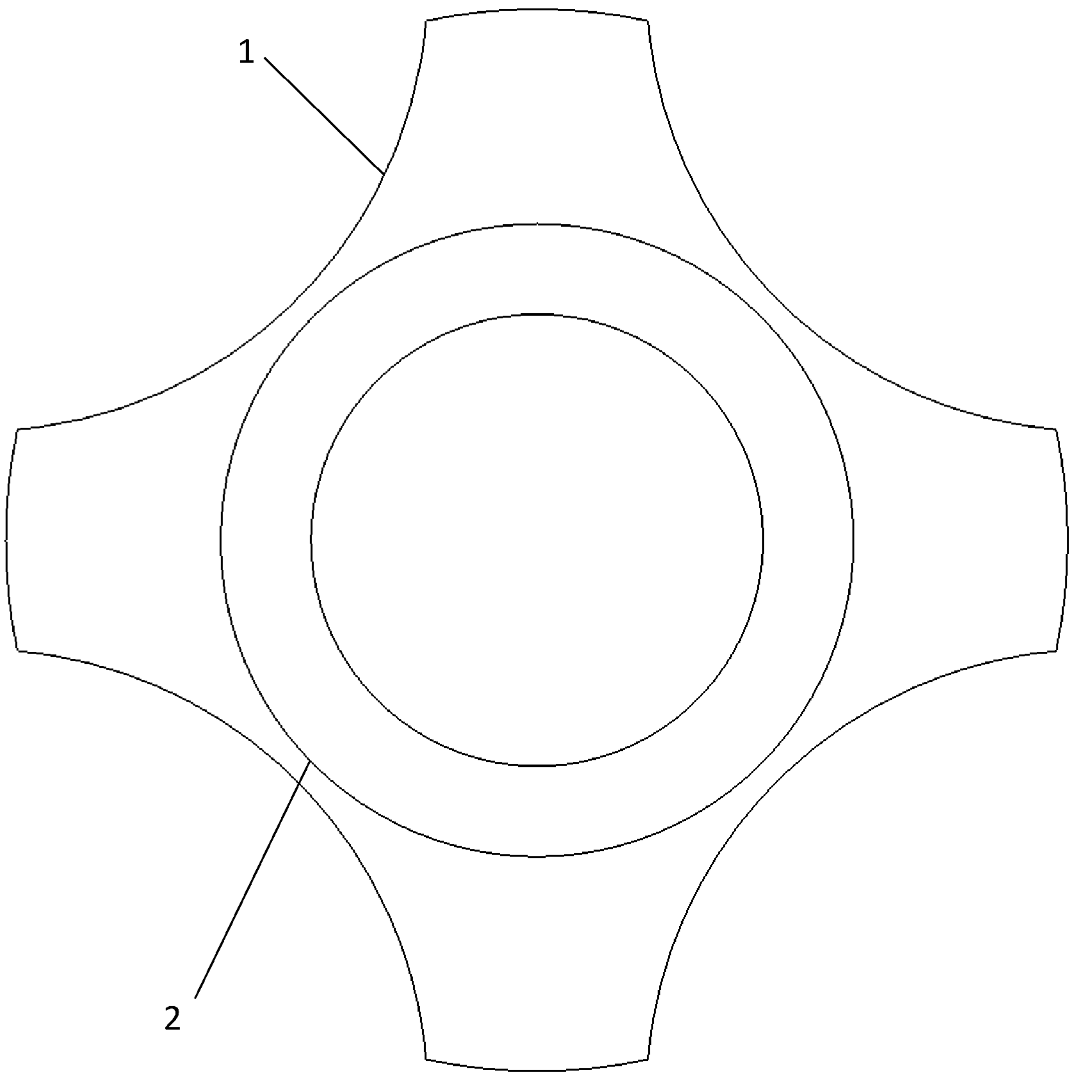
FIG. 9 illustrates an exemplary embodiment of a non-domed layer of spring material

For further embodiments, FIG. 8 illustrates an exemplary embodiment of an arciformed or bandiformed layer of spring material. As such, a first layer of spring material (1) and a second layer of spring material (2) may be used to form an arciformed spring material or bandiformed spring material. An arciformed spring material may be in a dome shape or in a non-dome shape, such as a circular ring, as shown in FIG. 9, or sheet, a rectangular strip, a triangular, an elliptical, a square, a rectangular, a pentagram, a heptagon, and but not limited to an octagon or other polygon form. Arciform spring material may also be flat or domed or may be configured as a switchdome. Some embodiments may use bandiformed spring material that may be, but is not limited to, material that has four sides perhaps where two of the sides have larger length than width or a material that has four equal length sides. Bandiformed may have significant length as to width and such as an item that essentially forms a strip over a dome or in some cases a ring.

As mentioned above, some embodiments can involve bonding strips or sheet material together before the tactile spring product is shaped and stamped out. Such bonding may be achieved through the use of adhesive, welding, forming, etc. The resulting stamped tactile dome product can be a multi-layer product that can provide for higher force properties (strength) while retaining desirable tactile and fatigue life properties. It also may allow for lower production and assembly costs because the multiple elements are handled as one. In certain designs, the bond might be rigid and only in the center, in others it may be more flexible and present in other (non-central) areas. In yet others, it may be a combination of a rigid bond (e.g., adhesive) in the center, and a more flexible bond (e.g., a differently formulated or applied adhesive) in non-central areas. In yet other embodiments, the bond may fully or mostly fill the space between the two products and may be flexible at least where such is required. The flexible bond may allow the two springs to flex a little relative to each other; such relative flex (relative displacement) may, e.g., allow for desired tactile feedback during and immediately after actuation, desired force properties, and/or desired fatigue life properties (including those related to adhesive functionality/breakdown properties). This may be beneficial because actuation of the stacked product may cause relative displacement between the upper and lower spring products (as a result of shear, compressive, and/or tensile stresses induced upon actuation). Relative displacement may be observed in some or all non-central areas of the stacked product. Further, embodiments may achieve the strength of an increased thickness, single layer dome product while avoiding the loss of life expectancy that is conventionally associated with that increased thickness, single layer dome product (fabricated using conventional methods). At least one embodiment of the inventive technology may be to use single layer material (typically conductive) to fabricate a product that has an overall strength that is greater than a single layer product made from that single layer material.

It should be noted that while examples of the inventive technology specifically disclosed herein, whether apparatus or method (process), may be described with reference to tactile switchdome components or domes, all of such inventive technology is not limited to tactile domes alone, as indeed it can include apparatus and methods that relate to domes that are not tactile in nature.

Accordingly, references to tactile domes herein can be adjusted to replace the term tactile with non-tactile, thus describing a similar group of non-tactile type embodiments. A non-tactile spring product made with this process might be conical with a center hole, may be a wave washer, may be dome shaped, or may have some other shape that can resist movement. This production process would in any case produce a product with higher spring force properties and longer fatigue life when repeatedly flexed and released.

While the invention has been described in connection with some preferred embodiments, it is not intended to limit the scope of the invention to the particular form set forth, but on the contrary, it is intended to cover such alternatives, modifications, and equivalents as may be included within the spirit and scope of the invention as defined by the statements of inventions.

As can be easily understood from the foregoing, the basic concepts of the present invention may be embodied in a variety of ways. It involves both switchdome techniques as well as devices or components to provide the appropriate switchdome products. In this application, such techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. For example, to the extent ultimately used, the existence or non-existence of a substance or condition in a particular input, action, or at a particular property such as a modulus can be specified as substantially only x or substantially free of or less than x, as a value of about x, or such other similar language. Using percentage values as one example, these types of terms should be understood as encompassing the options of percentage values that include 100%, 98%, 95%, 90% or even 75% of the specified value or relative condition; correspondingly for values at the other end of the spectrum (e.g., substantially free of or less than x, these should be understood as encompassing the options of percentage values that include not more than 0%, 2%, 5%, 10%, or even 25% of the specified value or relative condition. In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "bond" should be understood to encompass disclosure of the act of "bonding"—whether explicitly discussed or not—and, conversely, were there effectively disclosure of the act of "bonding", such a disclosure should be understood to encompass disclosure of a "bond" and even a "means for bonding" Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function. As other non-limiting examples, it should be understood that claim elements can also be expressed as any of: components that are configured to, or configured and arranged to, achieve a particular result, use, purpose, situation, function, or operation, or as components that are capable of achieving a particular result, use, purpose, situation, function, or operation. All should be understood as within the scope of this disclosure and written description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference.

Finally, all references filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the switchdome devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group*, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 8 or any other claim" or the like, it could be re-drafted as dependent on claim 1, claim 3, or even claim 5 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method of providing an integrated compound spring switchdome action apparatus comprising steps of:
- establishing a first layer of a spring material;
- establishing at least a second layer of an arciform spring material;
- switchdome bonding said first layer of said spring material with said at least second layer of said arciform spring material to establish an integrated bonded composite spring sheet material; and
- compositely forming an integrated, multi-springed, multilayered spring switchdome from said integrated bonded composite spring sheet material;
  - wherein said step of switchdome bonding comprises a step of interstice switchdome bonding;
  - wherein said step of switchdome bonding comprises a step of switchdome bonding prior to forming a domed shape; and
  - wherein said step of switchdome bonding comprises a step of bonding with a cure material having an elastic modulus within a range of two tenths to six tenths of a percent of an elastic modulus of said first layer of spring material or said second layer of said arciform spring material.

2. The method of providing an integrated compound spring switchdome action apparatus as described in claim 1 wherein said step of switchdome bonding comprises steps of:
- pre-curing a switchdome bond prior to forming a dome component; and
- pre-establishing said switchdome bond prior to forming said dome component.

3. The method of providing an integrated compound spring switchdome action apparatus as described in claim 1 wherein said step of switchdome bonding comprises a step of elastically bonding at at least some locale.

4. The method of providing an integrated compound spring switchdome action apparatus as described in claim 1 wherein said step of switchdome bonding comprises a step of establishing at least some nonorthographic elasticity bond.

5. The method of providing an integrated compound spring switchdome action apparatus as described in claim 1 wherein said first layer of said spring material and said at least said second layer of said arciform spring material comprises an unformed sheet switchdome spring material, and further comprising a step of forming said unformed sheet switchdome spring material after accomplishing said step of switchdome bonding.

6. The method of providing an integrated compound spring switchdome action apparatus as described in claim 1 wherein said steps of establishing said first layer of said spring material and establishing said at least said second layer of said arciform spring material comprise a step of establishing compositionally homologous spring materials.

7. The method of providing an integrated compound spring switchdome action apparatus as described in claim 1 further comprising a step of fully allowing flexure throughout a switchdome bond.

8. The method of providing an integrated compound spring switchdome action apparatus as described in claim 1 wherein said steps of establishing said first layer of said spring material and establishing said at least said second layer sheet of said arciform spring material comprise steps of:

utilizing said first layer of said spring material;

utilizing said at least said second layer of said arciform spring material, and further comprising a step of domiforming said first layer of said spring material and said at least said second layer of said arciform spring material after accomplishing said step of switchdome bonding.

9. The method of providing an integrated compound spring switchdome action apparatus as described in claim 1 wherein said step of establishing said first layer of said spring material comprises a step of utilizing a first dome, wherein said step of establishing said at least said second layer of said arciform spring material comprises a step of utilizing a second dome, and wherein said step of switchdome bonding said first layer of said spring material with said at least said second layer of said arciform spring material comprises a step of switchdome bonding said first dome to said second dome to create a conjoined integrated dome composite.

10. The method of providing an integrated compound spring switchdome action apparatus as described in claim 1 wherein said switchdome comprises a differential flexure switchdome component.

11. The method of providing an integrated compound spring switchdome action apparatus as described in claim 1 wherein said step of switchdome bonding comprises a step of central axis-perimeter antipodal rigidity switchdome bonding.

* * * * *